(12) United States Patent
Nakamura

(10) Patent No.: US 8,291,089 B2
(45) Date of Patent: *Oct. 16, 2012

(54) IMAGE PROCESSING DEVICE, CONTROL METHOD THEREFOR, AND PROGRAM

(75) Inventor: Tadahiro Nakamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

This patent is subject to a terminal disclaimer.

(21) Appl. No.: 12/401,436

(22) Filed: Mar. 10, 2009

(65) Prior Publication Data

US 2009/0182839 A1  Jul. 16, 2009

Related U.S. Application Data

(63) Continuation of application No. 11/184,880, filed on Jul. 20, 2005, now Pat. No. 7,509,427.

(30) Foreign Application Priority Data

Jul. 22, 2004 (JP) ................. 2004-214509

(51) Int. Cl.
*G06F 15/16* (2006.01)
*G06F 15/173* (2006.01)
*H04L 29/06* (2006.01)

(52) U.S. Cl. ........ 709/227; 709/203; 709/217; 709/223; 709/226; 713/151; 713/152; 713/153; 713/155; 713/168; 707/999.009; 707/999.01; 707/999.102; 707/999.107

(58) Field of Classification Search .......... 709/203, 709/217, 223, 226–227; 707/9–10, 102, 707/104.01, 999.009, 999.01, 999.102, 999.107; 713/151–153, 155, 168

See application file for complete search history.

(56) References Cited

U.S. PATENT DOCUMENTS

| | | | | |
|---|---|---|---|---|
| 6,345,143 | B2 * | 2/2002 | Kanda | 386/52 |
| 7,185,007 | B2 * | 2/2007 | Yagi | 1/1 |
| 7,379,958 | B2 * | 5/2008 | Karhu | 709/201 |

(Continued)

FOREIGN PATENT DOCUMENTS

JP  8-6884  1/1996

OTHER PUBLICATIONS

"Frontline in Business-to-Business EC", Nikkei Internet Technology No. 46, pp. 38-43, Apr. 22, 2001 (whole English-language translation).

(Continued)

*Primary Examiner* — John Follansbee
*Assistant Examiner* — Saket K Daftuar
(74) *Attorney, Agent, or Firm* — Fitzpatrick, Cella, Harper & Scinto

(57) ABSTRACT

An image processing device communicable with an information processing device, includes: a first management unit for managing at least one service provided by the image processing device based on a first protocol; a second management unit for managing the at least one service provided by the image processing device based on a second protocol; a reception unit for receiving a search request for searching for a service managed by the second management unit, the search request being transmitted from the information processing device based on the first protocol; and a transmission unit for transmitting, in response to the search request received by the reception unit, an address of a service satisfying the search request and managed by the second management unit to the information processing device.

13 Claims, 18 Drawing Sheets

U.S. PATENT DOCUMENTS

| | | | |
|---|---|---|---|
| 7,389,328 B2* | 6/2008 | Yeung et al. | 709/218 |
| 7,428,582 B2* | 9/2008 | Bean et al. | 709/218 |
| 7,437,458 B1* | 10/2008 | Stewart et al. | 709/226 |
| 7,460,262 B2* | 12/2008 | Simpson | 358/1.15 |
| 7,461,081 B2* | 12/2008 | Matsuda et al. | 1/1 |
| 7,506,072 B2* | 3/2009 | Waldorf et al. | 709/249 |
| 7,562,217 B2* | 7/2009 | Kurose | 713/168 |
| 7,613,404 B2* | 11/2009 | Takeuchi et al. | 399/8 |
| 7,647,319 B2* | 1/2010 | Nishio et al. | 713/153 |
| 7,684,074 B2* | 3/2010 | Reddy et al. | 358/1.15 |
| 7,738,808 B2* | 6/2010 | Lovat et al. | 399/79 |
| 7,743,162 B2* | 6/2010 | Matsushima | 709/232 |
| 7,752,288 B2* | 7/2010 | Mihira et al. | 709/221 |
| 7,752,298 B2* | 7/2010 | Fujii et al. | 709/223 |
| 7,756,955 B2* | 7/2010 | Takagi | 709/221 |
| 7,760,383 B2* | 7/2010 | Matsuda et al. | 358/1.15 |
| 7,765,248 B2* | 7/2010 | Kanasaki | 709/203 |
| 7,788,377 B2* | 8/2010 | Itoh et al. | 709/226 |
| 2001/0004739 A1 | 6/2001 | Sekiguchi | |
| 2002/0007414 A1* | 1/2002 | Inoue et al. | 709/230 |
| 2002/0032769 A1* | 3/2002 | Barkai et al. | 709/224 |
| 2002/0075844 A1* | 6/2002 | Hagen | 370/351 |
| 2002/0122203 A1 | 9/2002 | Matsuda | |
| 2003/0225894 A1* | 12/2003 | Ito | 709/227 |
| 2004/0008372 A1* | 1/2004 | Akashi et al. | 358/1.15 |
| 2004/0095601 A1* | 5/2004 | Ozawa | 358/1.15 |
| 2004/0143566 A1 | 7/2004 | Fukasawa | |
| 2004/0148379 A1* | 7/2004 | Ogura | 709/223 |
| 2004/0199616 A1* | 10/2004 | Karhu | 709/221 |
| 2004/0205163 A1* | 10/2004 | Yagi | 709/219 |
| 2004/0210835 A1* | 10/2004 | Kurumatani | 715/513 |
| 2004/0257610 A1* | 12/2004 | Itoh et al. | 358/1.15 |
| 2005/0015585 A1* | 1/2005 | Kurose | 713/155 |
| 2005/0049012 A1* | 3/2005 | Chang et al. | 455/574 |
| 2005/0198494 A1* | 9/2005 | Ishibashi | 713/155 |
| 2008/0022087 A1* | 1/2008 | Tsujimoto | 713/155 |
| 2008/0098321 A1* | 4/2008 | Krithivas | 715/771 |
| 2009/0013065 A1* | 1/2009 | Nagashima | 709/223 |
| 2009/0198811 A1* | 8/2009 | Yasui et al. | 709/223 |
| 2010/0257067 A1* | 10/2010 | Chan | 705/21 |

OTHER PUBLICATIONS

"Internet Product in the Spot", Nikkei Internet Technology No. 43, pp. 136-139, Jan. 22, 2001 (whole English-language translation).

* cited by examiner

FIG. 5

```
SERVICE NAME: PrintService.OOO
ACCESS URL: http://192.168.0.1/print
```

FIG. 6

```
<env:Envelope xmlns:env="http://schemas.xmlsoap.org/soap/envelope/"
env:encodingStyle="http://schemas.xmlsoap.org/soap/encoding/">
 <env:Body>
  <find_service xmlns="urn:uddi-org:api_v2" generic="2.0">
    <name>PrintService.OOO</name>
  </find_service>
 </env:Body>
</env:Envelope>
```

FIG. 7

```
<env:Envelope xmlns:env="http://schemas.xmlsoap.org/soap/envelope/"
env:encodingStyle="http://schemas.xmlsoap.org/soap/encoding/">
  <env:Body>
    <serviceList xmlns="urn:uddi-org:api_v2" generic="2.0" operator=" ">
      <serviceInfos>
        <serviceInfo serviceKey="XXXXXXXX-XXXX-XXXX-XXXX-XXXXXXXXXXXX" businessKey" ">
          <name>PrintService.○○○</name>
        </serviceInfo>
      </serviceInfos>
    </serviceList>
  </env:Body>
</env:Envelope>
```

FIG. 8

```
<env:Envelope xmlns:env="http://schemas.xmlsoap.org/soap/envelope/"
env:encodingStyle="http://schemas.xmlsoap.org/soap/encoding/">
  <env:Body>
    <get_serviceDetail xmlns="urn:uddi-org:api_v2" generic="2.0">
      <serviceKey="XXXXXXXX-XXXX-XXXX-XXXX-XXXXXXXXXXXX</serviceKey>
    </get_serviceDetail>
  </env:Body>
</env:Envelope>
```

FIG. 9

```
<env:Envelope xmlns:env="http://schemas.xmlsoap.org/soap/envelope/"
env:encodingStyle="http://schemas.xmlsoap.org/soap/encoding/">
  <env:Body>
    <serviceDetail xmlns="urn:uddi-org:api_v2" generic="2.0" operator=" ">
      <businessService serviceKey="XXXXXXXX-XXXX-XXXX-XXXX-XXXXXXXXXXXX
businessKey=" ">
        <name>PrintService.○○○</name>
        <description/>
        <bindingTemplates>
          <bindingTemplate bindingKey="YYYYYYYY-YYYY-YYYY-YYYY-YYYYYYYYYYYY"
serviceKey="XXXXXXXX-XXXX-XXXX-XXXX-XXXXXXXXXXXX">
            <description/>
            <accessPoint URLType="http">http://192.168.0.1/print</accessPoint>
            <tModelInstanceDetails/>
          </bindingTemplate>
        </bindingTemplates>
      </businessService>
    </serviceDetail>
  </env:Body>
</env:Envelope>
```

FIG. 12

| | |
|---|---|
| Version: | 0x02 |
| Function-ID | 0x01 (Service Request) |
| Length: | 0x000026 |
| Flag: | 0x2000 |
| Next Ext Offset: | 0x000000 |
| XID | 0x0001 |
| Language Tag Length: | 0x0002 |
| Language Tag: | "en" |
| length of <PRList>: | 0x0000 |
| <PRList> String: | NULL |
| length of <service-Type>: | 0x001a |
| <service-type> String: | "service:ws-discovery.○○○" |
| length of <scope-list>: | 0x0005 |
| <scoop-list> String: | "○○○" |
| length of predicate string: | 0x0000 |
| Service Request <predicate>: | NULL |
| length of <SLP SPI> string: | 0x0000 |
| <SLP SPI> String: | NULL |

FIG. 13

| | |
|---|---|
| Version: | 0x02 |
| Function-ID | 0x02 (Service Reply) |
| Length: | 0x00004b |
| Flag: | 0x0000 |
| Next Ext Offset: | 0x000000 |
| XID | 0x0001 |
| Language Tag Length: | 0x0002 |
| Language Tag: | "en" |
| Error Code: | 0x0000 |
| URL Entry Count: | 0x0001 |
| Reserved: | 0x00 |
| Lifetime: | 0xffff |
| URL Length: | 0x0031 |
| URL: | "service:ws-discovery.○○○:http//192.168.0.1/sds" |
| Num of URL auths: | 0x00 |

FIG. 15

| DEVICE NO. | URL OF WEB SERVICE MANAGEMENT UNIT |
|---|---|
| 1 | http://192.168.0.1/sds |
| 2 | http://192.168.0.2/sds |
| . | |
| . | |

FIG. 16

| DEVICE NO. | URL OF PRINT SERVICE |
|---|---|
| 1 | http://192.168.0.1/print |
| 2 | http://192.168.0.2/print |
| . | |
| . | |

FIG. 18

| | |
|---|---|
| Version: | 0x02 |
| Function-ID | 0x01 (Service Request) |
| Length: | 0x000026 |
| Flag: | 0x2000 |
| Next Ext Offset: | 0x000000 |
| XID | 0x0001 |
| Language Tag Length: | 0x0002 |
| Language Tag: | "en" |
| length of <PRList>: | 0x0000 |
| <PRList> String: | NULL |
| length of <service-type>: | 0x001a |
| <service-type> String: | "service:PrintService.○○○" |
| length of <scope-list>: | 0x0005 |
| <scoop-list> String: | "○○○" |
| length of predicate string: | 0x0000 |
| Service Request <predicate>: | NULL |
| length of <SLP SPI> string: | 0x0000 |
| <SLP SPI> String: | NULL |

FIG. 19

| | |
|---|---|
| Version: | 0x02 |
| Function-ID | 0x02 (Service Reply) |
| Length: | 0x00004d |
| Flag: | 0x0000 |
| Next Ext Offset: | 0x000000 |
| XID | 0x0001 |
| Language Tag Length: | 0x0002 |
| Language Tag: | "en" |
| Error Code: | 0x0000 |
| URL Entry Count: | 0x0001 |
| Reserved: | 0x00 |
| Lifetime: | 0xffff |
| URL Length: | 0x0033 |
| URL: | "service:PrintService.○○○:http//192.168.0.1/print" |
| Num of URL auths: | 0x00 |

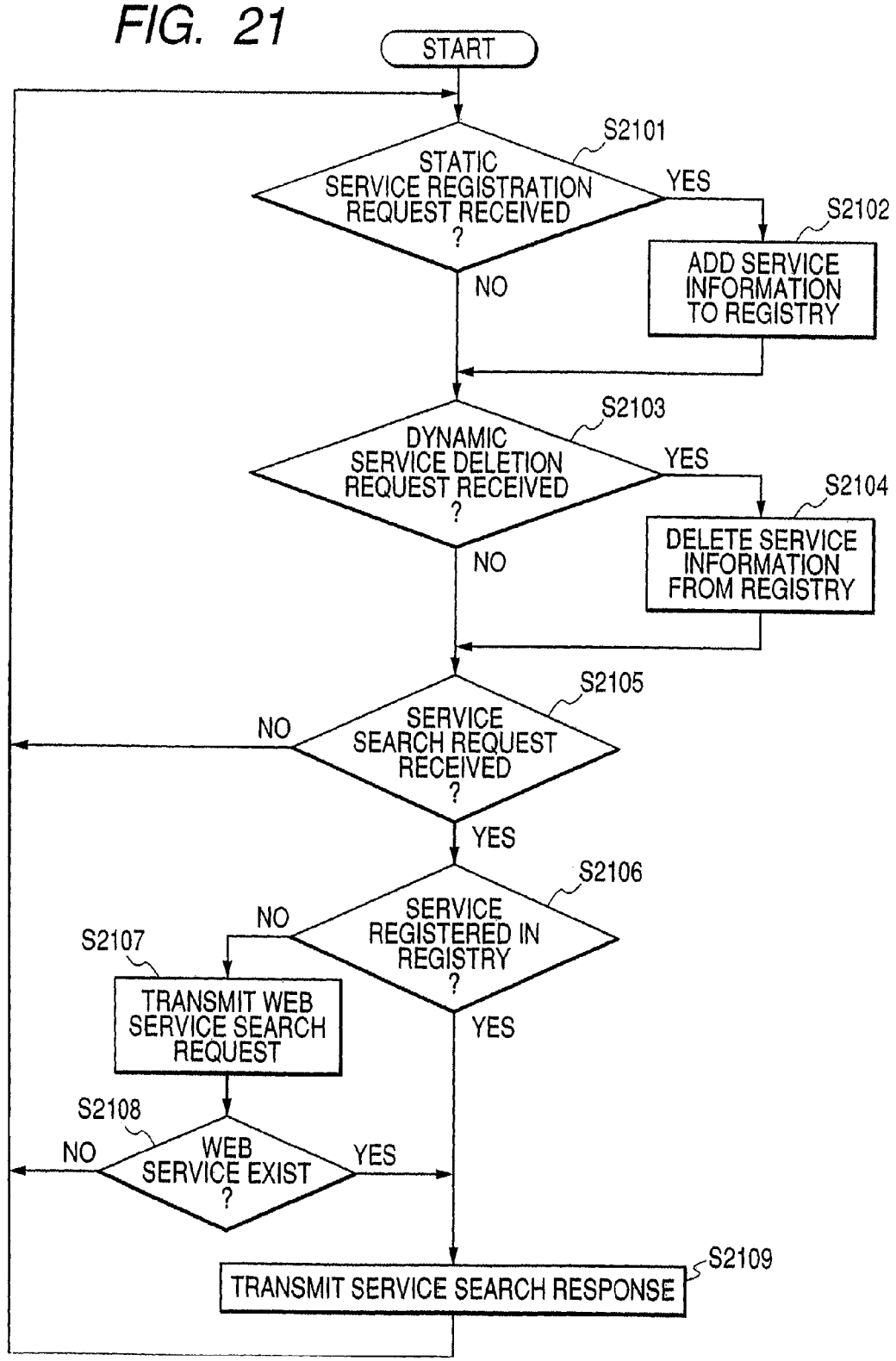

IMAGE PROCESSING DEVICE, CONTROL METHOD THEREFOR, AND PROGRAM

This application is a continuation of application Ser. No. 11/184,880, filed Jul. 20, 2005.

BACKGROUND OF THE INVENTION

1. Field of the Invention

The present invention relates to an image processing device capable of providing a Web service, a control method therefor, and a program.

2. Related Background Art

In recent years, a Web service technology has attracted great attention in the Internet. The Web service is a technology for gently coupling various services dispersed on a network to one another. By utilizing this technology, it is possible for a program to dynamically select an appropriate service without a human operation interposed therein, and the Web service is expected by various industrial fields, as a technology for automatically executing target processing. Data exchanged in the Web service is described in eXtensible Markup Language (XML), and such XML data is communicated on the network by using Simple Object Access Protocol (SOAP). The SOAP is a protocol for accessing an object in a remote environment by using the XML. The SOAP is defined to use, in lower layers thereof, such protocols as Hyper Text Transfer Protocol (HTTP), Simple Mail Transfer Protocol (SMTP) and File Transfer Protocol (FTP). Accordingly, it is not necessary to open extra ports to the network, and the SOAP is easily usable in the Internet in a similar way to Web browsing and electronic mail.

Further, as a technical specification for use in the Web service technology, Universal Description, Discovery and Integration (UDDI) is given. The UDDI is architecture for registering and discovering the Web service. It is possible for the Web service to register service information by using the UDDI, and for a user of the Web service to discover the Web service by using the UDDI. It is possible to acquire a technical specification of the UDDI from http://uddi.org.

Application of this Web service technology to an image processing device makes it possible to obtain various merits. For example, in the conventional image processing device, a client has prepared an original protocol of its own for the purpose of searching for various services, such as a print service and a scan service, which are provided by the image processing device. Meanwhile, in the image processing device implemented with the Web service, the service information is registered in a UDDI server on the network, and it is made possible for the client to search for the Web service information from the UDDI server by using an integrated interface. Further, since this interface is a standardized one, it is possible to search for various services therethrough without being limited to those from the image processing device. Still further, in an environment where an independent UDDI server is not present on the network, it is also possible for the image processing device itself to implement a function of the UDDI server therein, and to search for, from the client, the services provided by the image processing device. As described above, it is expected that the image processing device to which the Web service technology having various merits is applied will be developed more and more in the future.

Meanwhile, as described above, an image processing device is considered, which searches for the service providable by itself from the client based on the original protocol of each one's own in the conventional image processing device, and makes the providable service usable.

As an example of the above, there is an image processing device implemented with Service Location Protocol (SLP). The SLP is a protocol defined by RFC 2608. By using this technology, the client can search an image processing device that provides desired services such as the print service and the scan service from the network. Japanese Patent Application Laid-Open No. H8-6884 discloses a search system by which the client can search the image processing device that provides the desired services.

However, in the case of considering an image processing device implemented with both functions, which are: a function to implement with the function of the above-described UDDI server and to make the Web service provided by itself searchable from the client; and a function to make the service provided by itself searchable based on the above-described original protocol, there occurs such a problem that the searchable services are limited depending on whether a search request from the client is one made for the UDDI server that is based on the technology of the Web service or one based on the original protocol implemented in the image processing device.

Accordingly, in order to allow the client to search for the Web service provided by the image processing device by using the above-described original protocol other than the UDDI, it is necessary to make the respective Web service programs correspond to the respective protocols other than the above.

However, though a mechanism called the UDDI for the service search is provided, it is necessary to revise the entire existing Web service programs every time when the protocol for the search is newly laid out and implemented, and this is inefficient.

SUMMARY OF THE INVENTION

The present invention has been made to solve the above-described problem. It is an object of the present invention to provide an image processing device capable of searching for a service managed by a first protocol in response to a search request based on a second protocol, and to provide a control method therefor.

According to one aspect of the present invention, an image processing device communicable with an information processing device, includes:

a first management unit for managing at least one service provided by the image processing device based on a first protocol;

a second management unit for managing the at least one service provided by the image processing device based on a second protocol;

a reception unit for receiving a search request for searching for a service managed by the second management unit, the search request being transmitted from the information processing device based on the first protocol; and a transmission unit for transmitting, in response to the search request received by the reception unit, an address of a service satisfying the search request and managed by the second management unit to the information processing device.

Further, according to another aspect of the present invention, a control method for an image processing device communicable with an information processing device, includes:

a first management step of managing at least one service provided by the image processing device based on a first protocol;

a second management step of managing the at least one service provided by the image processing device based on a second protocol;

a reception step of receiving a search request for searching for a service managed by the second management step, the search request being transmitted from the information processing device based on the first protocol; and a transmission step of transmitting, in response to the search request received by the reception step, an address of a service satisfying the search request and managed by the second management step to the information processing device.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is an example of service information included in a service registration request in the first embodiment.

FIG. 6 is an example of a Web service search request in the first embodiment.

FIG. 7 is an example of a Web service search response in the first embodiment.

FIG. 8 is an example of a Web service detailed information acquisition request in the first embodiment.

FIG. 9 is an example of a Web service detailed information acquisition response in the first embodiment.

FIG. 12 is an example of a service search request in the first embodiment.

FIG. 13 is an example of a service search response in the first embodiment.

FIG. 15 is an example of a list of image processing devices, which is prepared by a host computer, in the first embodiment.

FIG. 16 is an example of the list of the image processing devices, which is prepared by the host computer, in the first embodiment.

FIG. 18 is an example of the service search request in the second embodiment and a third embodiment.

FIG. 19 is an example of the service search response in the second and third embodiments.

FIG. 21 is a flowchart showing processing of the service management unit 307 in the third embodiment.

DESCRIPTION OF THE PREFERRED EMBODIMENTS (First Embodiment)

A first embodiment of the present invention will be described below in detail with reference to the drawings.

Figure 1:
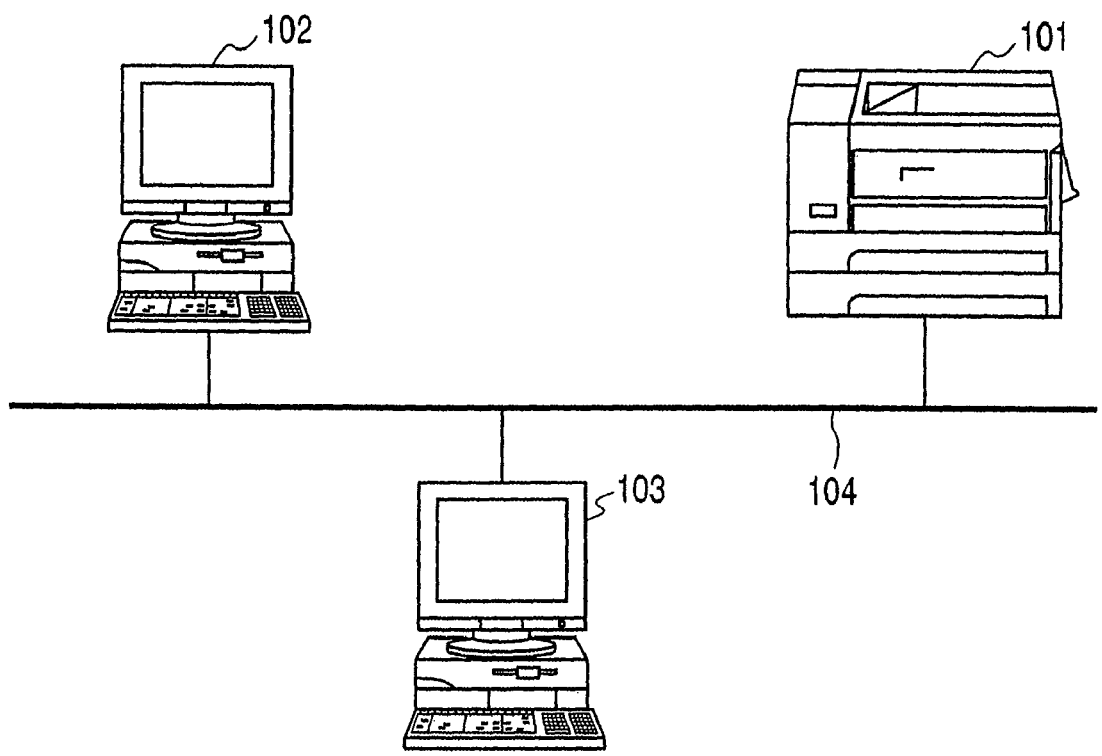
FIG. 1 is a diagram showing a construction example of a service search system in a first embodiment.

FIG. 1 is a block diagram showing a construction example of a service search system applicable in this embodiment.

An image processing device 101 is connected to a network 104, and is communicable with host computers 102 and 103. The image processing device 101 puts a print function thereof on public as a Web service while naming the function concerned a print service, and it is possible for the host computers 102 and 103 to search for the print service. This print service provides, to a user, such functions as submission/deletion of a print job and information acquisition of device/job. By using SOAP as a technical specification for use in the Web service, it is possible to use these functions through the host computers.

Figure 2:
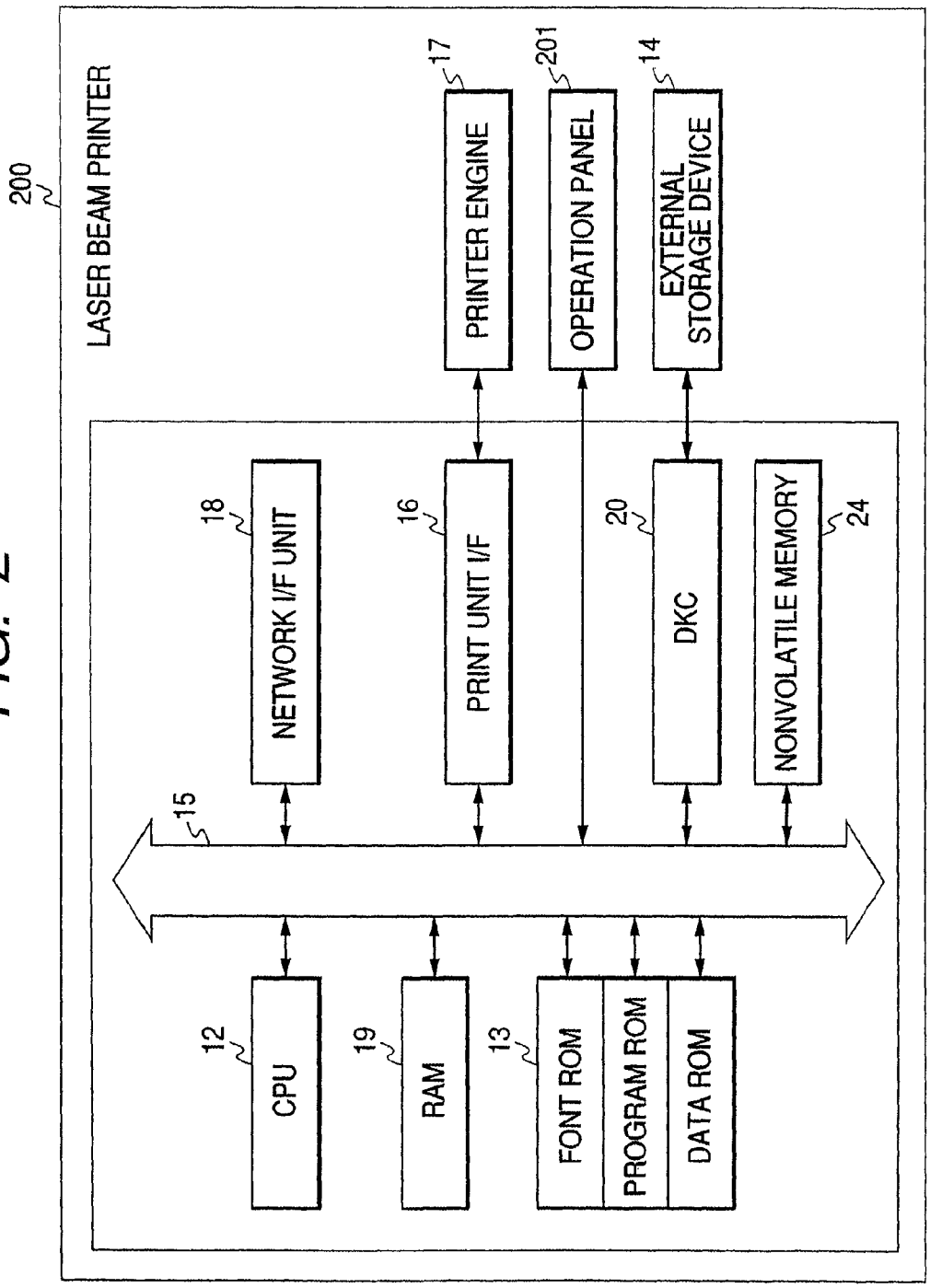
FIG. 2 is a diagram showing a hardware configuration of an image processing device in the first embodiment.

FIG. 2 is a block diagram for explaining a hardware configuration of the image processing device in this embodiment. Note that the hardware configuration will be described here by taking a laser beam printer as an example. In a laser beam printer 200 of FIG. 2, reference numeral 12 denotes a printer CPU (CPU), which comprehensively controls accesses thereof to various devices connected to a system bus 15, based on a control program stored in a program ROM of a ROM 13, and outputs an image signal as output information to a print unit (printer engine) 17 connected thereto through a print unit I/F 16. Further, in the program ROM of the ROM 13, a control program and the like executable by the CPU 12 are stored. Still further, in a font ROM of the ROM 13, font data (including outline font data) and the like to be used in the case of creating the output information are stored, and in a data ROM of the ROM 13, information and the like to be utilized on the host computers are stored. The CPU 12 is made capable of executing communication processing with the host computers on the network through a network I/F unit 18. Reference numeral 19 denotes a RAM which mainly functions as a main memory, a work area, and the like of the CPU 12, and is configured such that the memory capacity can be expanded by use of an optional RAM connected to an unillustrated expansion port. Note that the RAM 19 is used for an expanding region of the output information, a storage region of environmental data, and the like. An access to an external storage device 14 such as a hard disk (HD) and an IC card is controlled by a disk controller (DKC) 20. The hard disk is connected as an option to the laser beam printer 200, and is used for storing the font data, an emulation program, form data, and the like, and fused as a job storage region for temporarily spooling a print job and controlling the spooled job from the outside. Further, reference numeral 201 denotes an operation panel, to which the user can input various types of information from software keys. The number of the above-described external storage device is not limited to one, and at least two or more external storage devices may be provided to establish a configuration in which a plurality of external memories can be connected to the laser beam printer 200, the external memories having optional font cards therein in addition to built-in fonts, and having programs for interpreting printer control languages different in language system therein. Reference numeral 24 denotes a nonvolatile memory, which stores printer mode setting information from the operation panel 201 for each user and for each group.

Further, though unillustrated, it is made possible to further attach, as options, various expansion devices such as a finisher for performing stapling and sorting functions and a duplex device for realizing a duplex printing function to the printer 200, and operations of these devices are controlled from the CPU 12. Note that, though description has been made of the case of the laser beam printer as the image processing device in the example of FIG. 2, the image processing device of the present invention may be a complex machine, a copier, a scanner, an inkjet printer, and the like.

Figure 3:
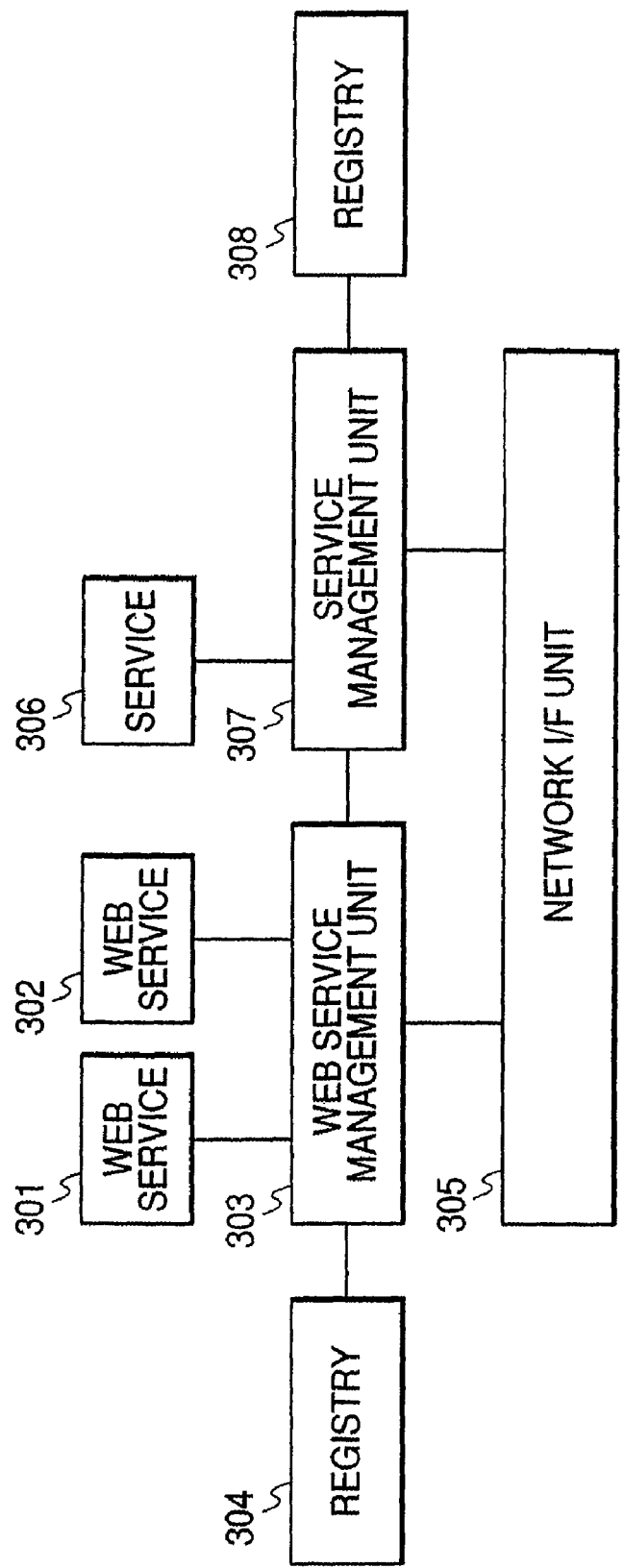
FIG. 3 is a diagram showing a software program configuration of the image processing device in the first embodiment.

FIG. 3 is a block diagram for explaining a software program configuration of the image processing device in this embodiment.

Reference numerals 301 and 302 are Web services provided by the image processing device. Specifically, the Web services are a print service realizing a printing function, a charge service providing charge information corresponding to the printing, and the like. Further, in the case where the image processing device is not the laser beam printer but the complex machine, it is also possible to provide such Web services as a scan service and a storage service. Note that, though the number, type and the like of the Web services are not defined in the present invention, FIG. 3 shows an example where the Web services are two as an example.

A Web service management unit 303 manages information of the Web services 301 and 302, and stores such service information in a Web service registry 304. Further, it is possible for the Web service management unit 303 to receive a Web service search request to be described later from the host computers 102 and 103 through a network I/F unit 305, and to respond thereto.

Meanwhile, reference numeral 306 denotes a service provided by the image processing device, which is other than the Web services. Specifically, the service is Internet Printing Protocol (IPP), Line Printer Daemon (LPD), and the like. Reference numeral 307 denotes a service management unit for managing these services. Specifically, the service management unit 307 implements a Service Agent (SA) function defined by Service Location Protocol (SLP) therein. Note that, though the number, type, and the like of the service and the service management unit are not defined in the present invention, FIG. 3 shows an example where each thereof is one as an example.

The service management unit 307 stores information of the service managed thereby in a service registry 308. It is possible for this service management unit 307 to receive a service search request to be described later from the host computers 102 and 103 through the network I/F unit 305 and to respond thereto, in accordance with a predetermined protocol. Further, the Web service management unit 303 and the service management unit 307 are communicable with each other.

Figure 4:
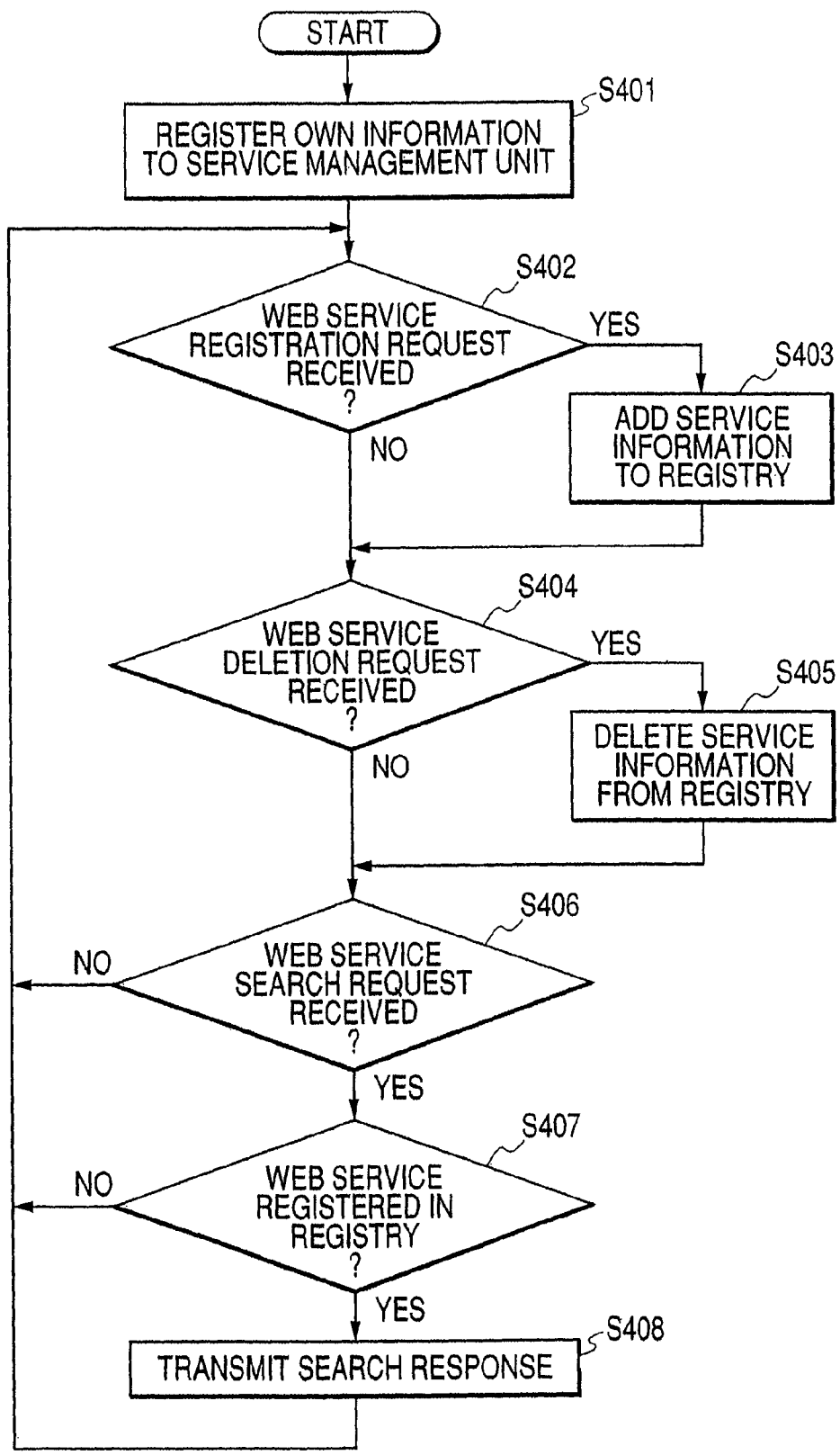
FIG. 4 is a flowchart showing processing of a Web service management unit 303 in the first embodiment.

FIG. 4 is a flowchart showing processing of the Web service management unit 303 in FIG. 3. Upon activation, the Web service management unit 303 registers information of its own to the service management unit 307 in Step S401. An example of the registered information is shown in a column denoted by reference numeral 1101 of FIG. 11. As shown in the numeral 1101 of FIG. 11, the registered information is composed of a type of the service and a URL for accessing the service. Note that, when a plurality of the service management units 307 exist, such registration processing is performed for the respective service management units.

Next, in Step S402, it is determined whether a service registration request has been received from each of the Web services 301 and 302. Here, the service registration request received from the Web service includes service information composed of a service name and a URL for accessing the Web service concerned as shown in FIG. 5. In the case of having received the service registration request, the Web service management unit 303 adds the service information to the Web service registry 304 in Step S403.

Next, in Step S404, it is determined whether the service deletion request has been received from each of the Web services 301 and 302. In the case of having received the service deletion request, the Web service management unit 303 deletes the applicable service information from the registry 304 in Step S405.

Next, in Step S406, it is determined whether the Web service search request has been received from each of the host computers 102 and 103. In the case of not having received the Web service search request, the processing returns to Step S402. In the case of having received the Web service search request, the processing proceeds to Step S407, where the received search request is analyzed, and it is determined whether the requested Web service is registered in the registry 304. When it is determined that the requested Web service is not present in the registry, the search request is discarded, and the processing returns to Step S402. When the requested Web service is registered, the processing proceeds to Step S408, where a result thereof is transmitted to the client. Then, the processing returns to Step S402.

FIG. 6 is an example of the Web service search request received by the Web service management unit 303 from each of the host computers 102 and 103 through the network. The search request is described in an XML format, and is communicated by using the SOAP. This example shows a search request taking, as a search key, a Web service name designated by a tag <name>, and is one inquiring whether a Web service of which service name is "PrintService.ooo" exists.

The web service management unit 303 receives this search request, and when a Web service of which name coincides with the search request is registered in the registry 304, returns a search response as shown in FIG. 7 to the host computer. In the search response, serviceKey for uniquely identifying the Web service is included. By designating the serviceKey, the host computer further transmits a detailed information acquisition request to the Web service management unit as shown in FIG. 8, and inquires detailed information of the Web service.

As a result, the host computer receives a response as shown in FIG. 9, and acquires a URL for accessing the Web service, which is shown by a tag <accessPoint>. Note that the XML formats of FIGS. 6 to 9 and the protocols thereof are defined by the UDDI specification.

Figure 10:
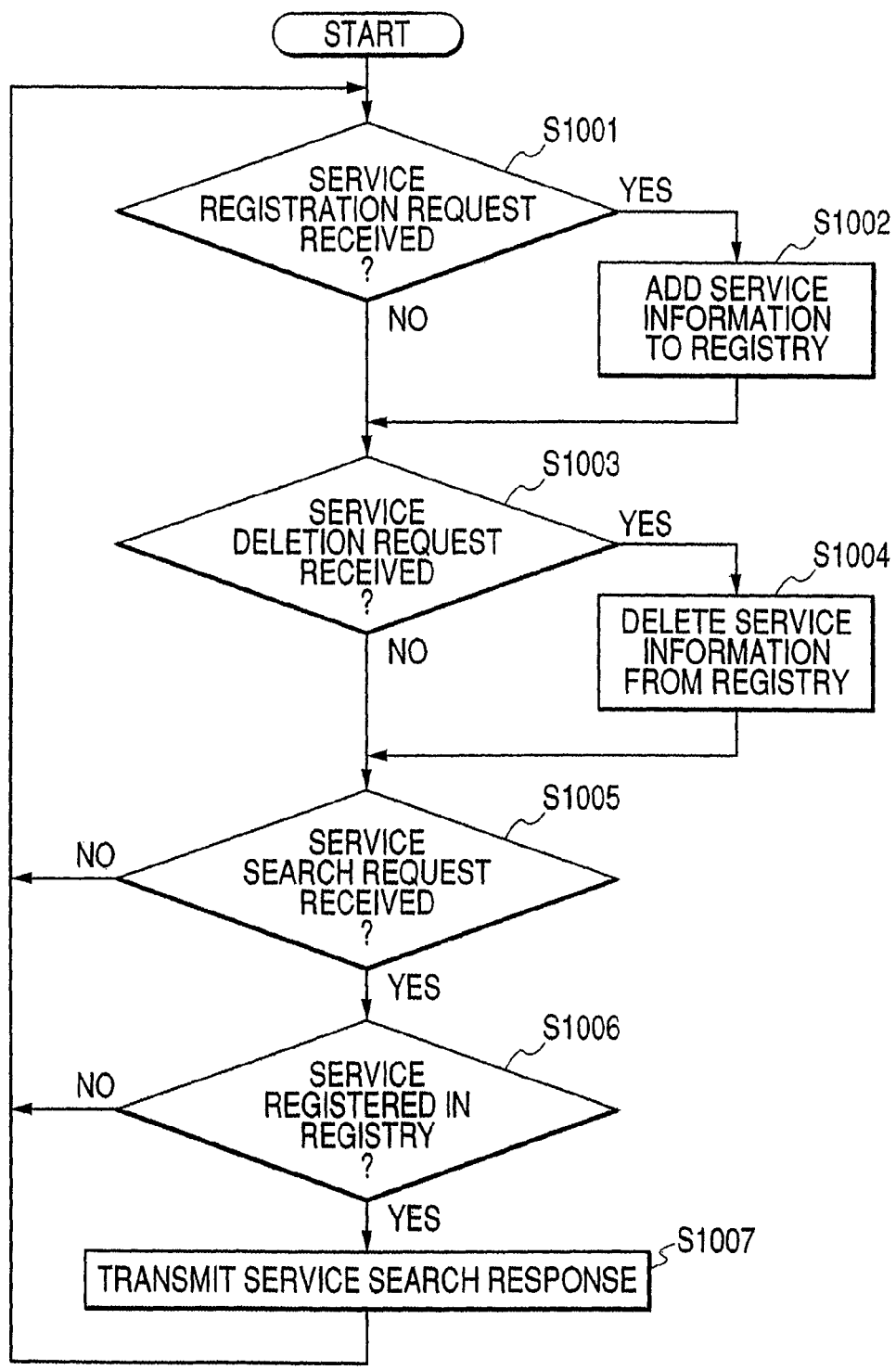
FIG. 10 is a flowchart showing a service management unit 307 in the first embodiment and a second embodiment.

FIG. 10 is a flowchart showing processing of the service management unit 307 in FIG. 3. Although it is possible that a plurality of the service management units exist, it is assumed in this embodiment that only one service management unit exists, which is an SLP server as a specific example.

Upon activation, the service management unit 307 determines in Step S1001 whether a registration request from each service set to be put on public by using the SLP has been received. In this embodiment, it is assumed to put on public Internet Printing Protocol (IPP) as the service 306, and the Web service management unit 303 by using the SLP. Specifically, the Web service management unit 303 itself playing a role to manage the Web service is also put on public as a service by using the SLP.

Figure 11:
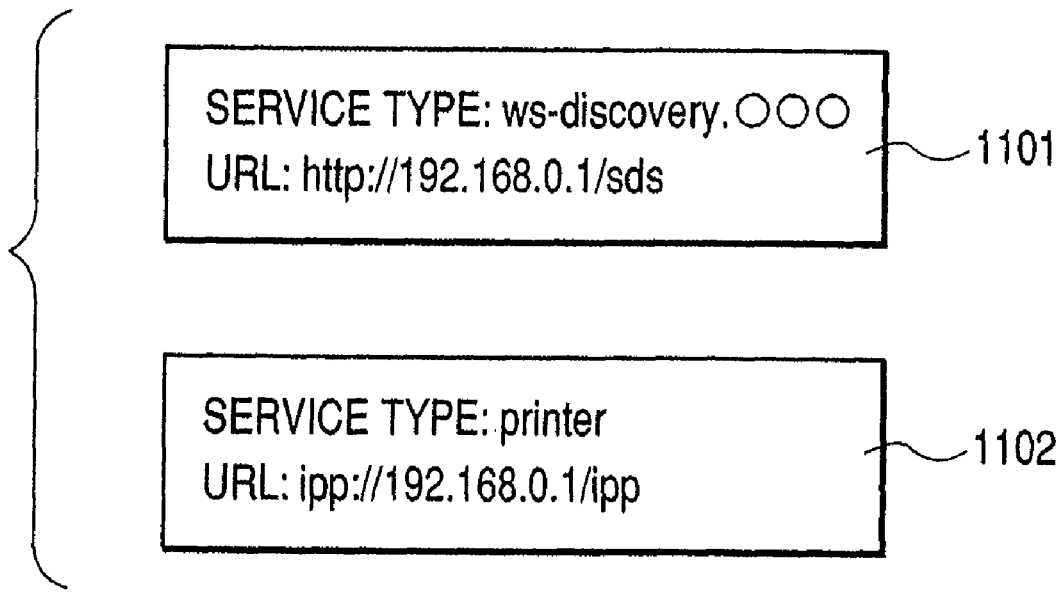
FIG. 11 is an example of service information registered in the service management unit 307 in the first embodiment.

FIG. 11 shows examples of service information registered from the Web service management unit 303 and the service 306. The column 1101 shows an example where the function provided by the service management unit 303 is registered as a service. A column 1102 shows an example where the print service using the IPP is registered. In the case of having received the registration request in Step S1001, the processing proceeds to Step S1002, where the service information is added to the service registry 308.

Next, in Step S1003, it is determined whether a service deletion request has been received from each of the Web service management unit 303 and the service 306. In the case of having received the service deletion request, the service management unit 307 deletes the service information concerned from the registry in Step 1004.

Next, in Step S1005, it is determined whether the service search request has been received from each of the host computers 102 and 103. When it has been determined in Step S1005 that the service search request has been received, the processing proceeds to Step S1006, where the received search request is analyzed, and it is determined whether the requested service is registered in the registry 308. When it has been determined that the requested service is not present in the registry, the search request is discarded, and the processing returns to Step S1001. When it is determined that the requested service is present in the registry, the processing proceeds to Step S1007, where a service search response is transmitted to the host computer. Then, the processing returns to Step S1001.

FIG. 12 is an example of the service search request received by the service management unit 307 from each of the host computers 102 and 103 through the network. This search request conforms to a format defined by the SLP specification, and is transmitted to a multicast address "239.255.255.253" registered in IANA (http://www.iana.org/) serving for the SLP.

The example shown in FIG. 12 is one inquiring whether a service of which service type is "ws-discovery.ooo" exists. Specifically, the example is one inquiring the existence of the service provided by the Web service management function, where an inquiry will be made as to whether the image processing device concerned is implemented with the Web service function. The service management unit 307 receives this search request, and when the service concerned is registered in the registry 308, returns a search response as shown in FIG. 13 to the host computer. In this search response, a URL for accessing the service concerned is included, and the host computers 102 and 103 will be able to discover a desired Web service by accessing the URL again. Note that, in FIGS. 12 and 13, binary encoded packets are formatted so as to make it easy to understand.

Figure 14:
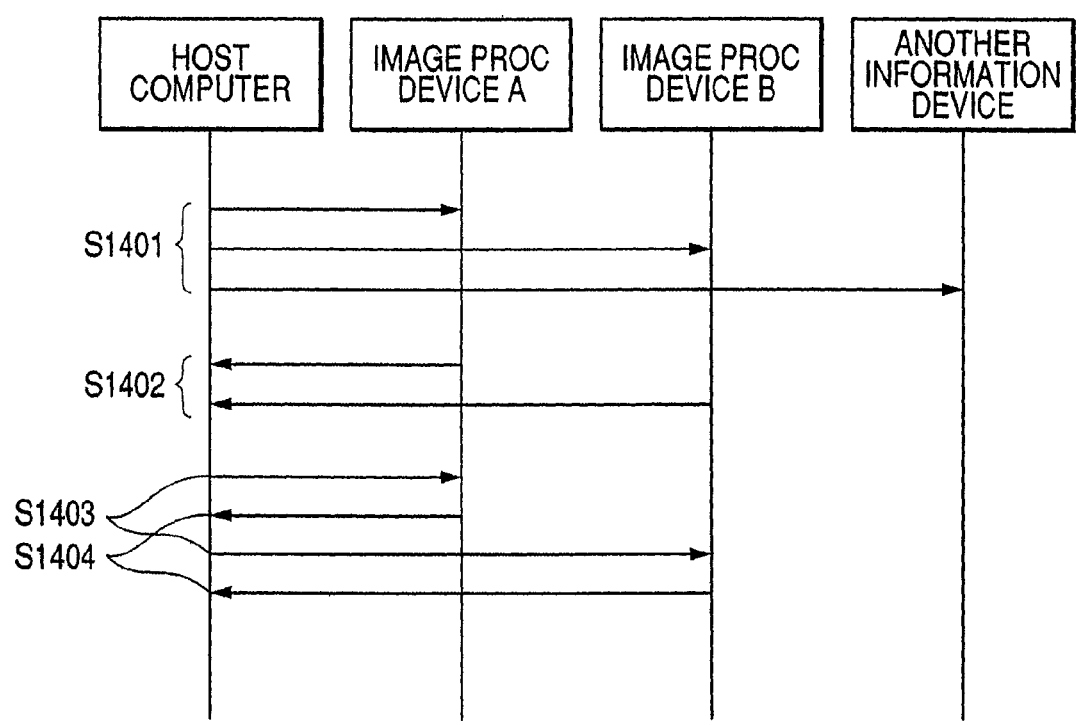
FIG. 14 is a diagram showing a search sequence in the first embodiment.

FIG. 14 is a diagram showing a search sequence where the host computers 102 and 103 search for the desired Web service provided by the image processing device from the network. It is premised that the host computer in FIG. 14 is communicable with an image processing device A, an image processing device B and another information instrument by a predetermined communication unit, that each of the image processing device A and the image processing device B is implemented with the SLP and the Web service, and that the other information instrument is not implemented with either one or both of the SLP and the Web service.

First, each of the host computers 102 and 103 transmits a search request packet by the SLP multicast shown in FIG. 12 in Step S1401. When each of the image processing device A and the image processing device B receives this search request packet, the processing shown in FIG. 10 is performed, and in Step S1402, the search response as shown in FIG. 13 is transmitted to each host computer.

Meanwhile, when the other information instrument receives the search request packet by the SLP multicast, the other information instrument cannot interpret the SLP or does not have the Web service management unit 303, and accordingly, the search request packet is simply discarded.

The host computer collects the search response, thereby creating a list of the image processing devices each having the Web service management unit. Specifically, a list of the image processing devices implemented with the Web services will be created. Here, the created list of the image processing devices is one as shown in FIG. 15, where URLs for accessing the Web service management units are shown.

Next, in Step S1403, the host computer sequentially transmits the Web service search requests as shown in FIG. 6 to all the image processing devices existing in the created list, and inquires whether or not the image processing devices have the desired Web service.

In Step S1404, each image processing device issues the search response as shown in FIG. 7 in the case of having the designated service, and otherwise, issues an error response. To the image processing device that has issued such a normal response, the host computer subsequently transmits the detailed information acquisition request as shown in FIG. 8, and obtains the response as shown in FIG. 9. In such a way, the host computer creates a list of the image processing devices providing desired services as shown in FIG. 16. The list of FIG. 16 shows results of the searches of the desired services by the host computer, showing URLs for accessing the services concerned. The host computer can receive the desired services by accessing the URLs concerned.

(Second Embodiment)

Next, a second embodiment will be described.

According to the first embodiment, it is made possible to search the Web service management unit by using the predetermined protocol implemented in the image processing device. However, it is necessary for the host computer to transmit two search requests such as the service search request based on the predetermined protocol and the Web service search request based on the Web service.

As opposed to this, in the second embodiment, it is made possible to discover the image processing device capable of providing the desired Web service by one transmission of the search request.

A basic configuration of this embodiment is the same as that of the first embodiment, and only differences thereof will be described. In this embodiment, the host computer does not issue the search request to the Web service management 303, but searches for the Web service by using a protocol processable by the service management unit 307.

Figure 17:
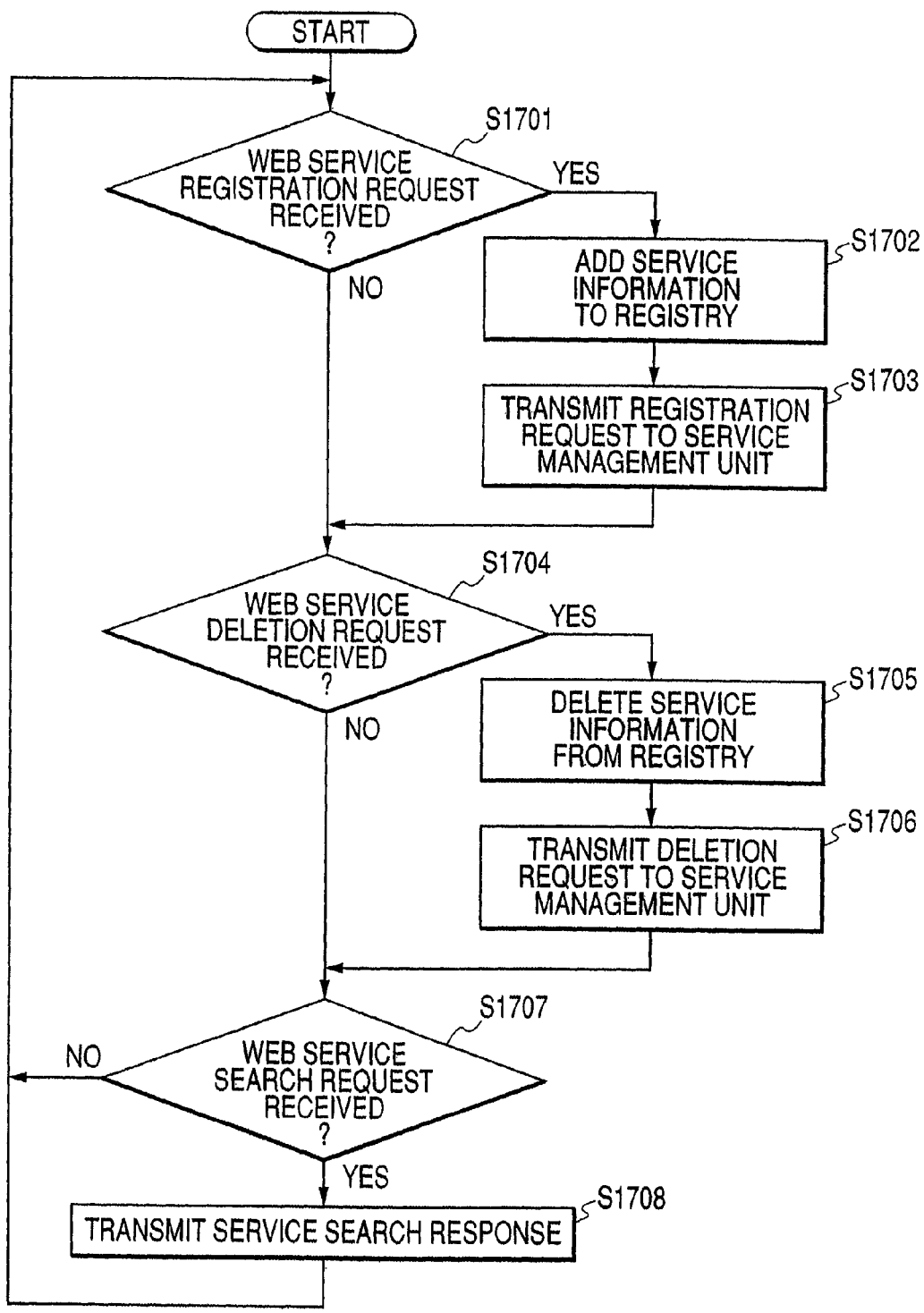
FIG. 17 is a flowchart showing processing of the Web service management unit 303 in the second embodiment.

FIG. 17 is a flowchart showing processing of the Web service management unit 303 in this embodiment.

Upon activation, the Web service management unit 303 determines in Step S1701 whether to have received the service registration requests from the Web services 301 and 302. In the case of having received the service registration requests, the Web service management unit 303 adds the service information to the registry 304 in Step S1702, and subsequently, transmits the registration request for the service information to the service management unit 307 in Step S1703. Meanwhile, the service management unit 307 that has received the registration request transmitted in Step S1703 adds the service information based on the Web services 301 and 302 to the registry 308 managed by itself. Specifically, in the registry managed by the service management unit 307, the service information of the Web services 301 and 302 and the service 306 will be stored.

Next, in Step S1704, it is determined whether the service deletion request has been received from each of the Web services 301 and 302. In the case of having received the service deletion request, the Web service management unit 303 deletes the applicable service information from the registry in Step S1705, and subsequently in Step S1706, transmits the service deletion request to the service management unit 307. The service management unit 307 that has received the service deletion request deletes the service information regarding the Web services 301 and 302, which is stored in the registry 308.

Next, in Step S1707, it is determined whether the Web service search request has been received from each of the host computers 102 and 103. In the case of not having received the Web service search request, the processing returns to Step S1701. In the case of having received the Web service search request, the processing proceeds to Step S1708, where the received search request is analyzed, and it is determined whether the requested Web service is registered in the registry 304. The processing returns to Step S1701 after transmitting a result of the determination to the client. Note that the search request/response packets are the same as those of the first embodiment.

The processing of the service management unit 307 in this embodiment is the same as that of the first embodiment, and is shown in the flowchart of FIG. 10. However, as shown in FIG. 17, the information of the respective Web services is also registered from the Web service management unit 303, and the individual Web service information is also managed by the registry 308.

FIG. 18 is an example of the service search request received by the service management unit 307 from each of the host computers 102 and 103 through the network. This search request conforms to the format defined by the SLP specification, and is transmitted to the multicast address "239.255.255.253" registered in the IANA (http://www.iana.org/) serving for the SLP. This example is one inquiring whether a service of which service name is "PrintService.ooo" exists. The service management unit 307 receives this search request, and when the service concerned is registered in the registry 308, returns a search response as shown in FIG. 19 to the host computer. Note that, in FIGS. 18 and 19, binary encoded packets are formatted so as to make it easy to understand.

Figure 20:
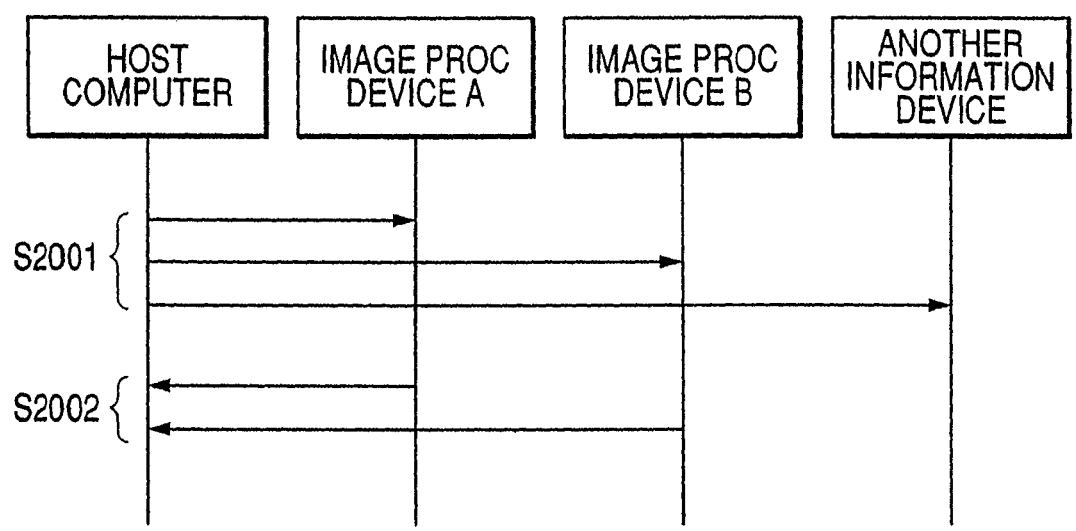
FIG. 20 is a view showing the service sequence in the second and third embodiments.

FIG. 20 is a diagram showing a search sequence where the host computers 102 and 103 search for the desired Web service provided by the image processing device from the network. As in FIG. 14, it is premised that the host computer in FIG. 20 is communicable with the image processing device A, the image processing device B and another information instrument by the predetermined communication unit, that each of the image processing device A and the image processing device B is implemented with the SLP and the Web service, and that the other information instrument is implemented with either one or both of the SLP and the Web service.

First, each of the host computers 102 and 103 transmits a search request packet by the SLP multicast shown in FIG. 18 in Step S2001. When each of the image processing device A and the image processing device B receives this search request packet, the processing shown in FIG. 18 is performed, and in Step S2002, the search response as shown in FIG. 19 is transmitted to each host computer.

Meanwhile, when the other information instrument receives the search request packet by the SLP multicast, the other information instrument cannot interpret the SLP or does not have the Web service management unit 303, and accordingly, the search request packet is simply discarded.

The host computer collects the search response, thereby creating a list of the image processing devices each having the Web service management unit.

The created list is similar to that of FIG. 16 in the first embodiment. The host computer can receive the desired services by accessing the URLs shown in the list concerned.

As described above, in the second embodiment, the information of the respective Web services is registered in advance in the registry of the SLP server through the Web service management unit. In such a way, it is possible for the host computer to search the image processing device providing the desired Web service by means of one search request by the SLP.

(Third Embodiment)

Next, a third embodiment will be described.

A basic configuration of this embodiment is the same as those of the first and second embodiments, and only differences thereof will be described. In this embodiment, as in the second embodiment, the host computer does not issue the search request to the Web service management 303, but searches for the Web service by using the protocol processable by the service management unit 307. Specifically, the host computer can discover the image processing device capable of providing the desired Web service by one transmission of the search request. However, internal processing of the host computer is different from that in the second embodiment.

As will be described later, the service management unit 307 divides the service put on public into a service managed by the registry of its own and a service managed by the Web service management unit 303. Note that, in the description below, the former one is referred to as a service statically put on public, and the latter one is referred to as a service dynamically put on public.

Processing of the Web service management unit 303 in this embodiment is the same as that of the first embodiment except that the Web service management unit 303 does not register the information of its own in the service management unit 307 immediately after the activation. Specifically, the processing becomes one in which Step S401 is omitted in the flowchart of FIG. 4. Further, the search request/response packets are the same as those of the first and second embodiments.

FIG. 21 is a flowchart showing processing of the service management unit 307 in this embodiment. Although it is possible that a plurality of the service management units exist, it is assumed in this embodiment that only one service management unit exists as in the first and second embodiments, which is the SLP server as a specific example. Upon activation, the service management unit 307 determines in Step S2101 whether a registration request from each service set to be statically put on public by using the SLP has been received. In this embodiment, it is assumed to statically put on public the Internet Printing Protocol (IPP) as the service 306. In the case of having received the registration request in Step S2101, the processing proceeds to Step S2102, where the service information is added to the registry 308. Next, in Step S2103, it is determined whether the service deletion request has been received from the service 306. In the case of having received the service deletion request, the applicable service information is deleted from the registry in Step S2104. Next, in Step S2105, it is determined whether the service search request has been received from each of the host computers 102 and 103. When it has been determined in Step S2105 that the service search request has been received, the processing proceeds to Step S2106, where the received search request is analyzed, and it is determined whether the requested service is registered in the registry 308. When it has been determined that the requested service is present in the registry, the processing proceeds to Step S2109, where the service search response is transmitted to the host computer. Then, the processing returns to Step S2101.

Meanwhile, when it has been determined in Step S2106 that the requested service is not present in the registry, the processing proceeds to Step S2107, where the Web service search request is transmitted to the Web service management unit 303. Here, a local loop back is used for the transmission of the Web service search request. Specifically, the Web service management unit 303 is ready for the Web service search by the UDDI, and accordingly, the service management unit 307 is capable of transmitting the search request to the Web service management unit 303 by using an interface of the UDDI, and the same search request as that in FIG. 6 is usable. Next, in Step S2108, a response from the Web service management unit 303 is received, and it is determined whether the service is present. When it has been determined that the service is not present, the search request received from the host computer is discarded, and the processing returns to Step S2101.

Meanwhile, when it has been determined that the service is present, the processing proceeds to Step S2109, where the service search response is transmitted to the host computer. Then, the processing returns to Step S2101.

Note that, in this embodiment, the search request/response packets exchanged between the host computer and the service management unit 307 and the search sequence viewed from the host computer are the same as those in the case of the second embodiment, and accordingly, description thereof will be omitted.

As described above, in the third embodiment, such a configuration is adopted that an inquiry about the requested service information is made to the Web service management unit when the SLP server does not have the requested service information in the registry of its own. In such a way, it is possible for the host computer to search the image processing device providing the desired Web service by one search request by the SLP.

Note that, though the local loop back is used as a search request transmission mode from the SLP server to the Web service management unit in the above-described embodiment, naturally, such a configuration is also possible that a dedicated interface is provided, and the interface is utilized.

(Other Embodiment)

Although the laser beam printer has been taken as the example of the image processing device in the first to third embodiments, the present invention is not limited to the laser beam printer, and is applicable to various image processing devices implemented with the UDDI servers and other predetermined search protocols.

Further, though the SLP has been taken as the example of the protocol implemented with the image processing device in the first to third embodiments, the present invention is not limited to this, and other protocols may be used as long as the protocols have the function of searching for the service provided by the image processing device. For example, the protocol may be Universal Plug and Play (UPnP™) proposed by the UPnP forum, BMLinkS™ promoted by the Japan Business Machine and Information System Industries Association (JBMIA), and the like.

Note that the present invention may be applied either to a system composed of plural instruments or a device composed of one instrument. A medium such as a recording medium recording a program code of software for realizing the functions of the above-described embodiments is supplied to the system or the device, and a computer (or a CPU or a MPU) of the system or the device reads and executes the program code stored in the medium such as the recording medium. It is needless to say that the present invention is achieved also in such a way.

In this case, the program code itself read out from the medium such as the recording medium will realize the functions of the above-described embodiments, and the medium such as the recording medium storing the program code will constitute the present invention. As the medium such as the recording medium for supplying the program code, for example, usable is a floppy (registered trademark) disk, a hard disk, an optical disc, a magneto-optical disc, a CD-ROM, a CD-R, a magnetic tape, a nonvolatile memory card, a ROM, or the like. In addition, the program code can be downloaded through the network.

Further, it is needless to say that not only the case where the functions of the above-described embodiments are realized by executing the program code read out by the computer, but also the case where an OS or the like operating on the computer executes a part or the whole of the actual processing based on an instruction of the program code, and the functions of the above-described embodiments are realized by the processing concerned, is also incorporated in the present invention.

Still further, needless to say, the following case is also incorporated in the present invention. Specifically, the program code read out from the medium such as the recording medium is written into a memory provided in a function expansion board inserted into the computer or in a function expansion unit connected to the computer. Subsequently, the CPU or the like provided in the function expansion board or the function expansion unit executes a part or the whole of the actual processing based on an instruction of the program code. By the processing concerned, the functions of the above-described embodiments are realized.

This application claims priority from Japanese Patent Application No. 2004-214509 filed Jul. 22, 2004, which is hereby incorporated by reference herein.

What is claimed is:

1. An image processing device which is communicable with an information processing device, comprising:
   a processor and memory;
   a first reception unit configured to receive an inquiry, transmitted from the information processing device on the basis of an SLP (Service Location Protocol), as to whether or not the image processing device is equipped with a function of a Web service;
   a first response unit configured to, in a case where the image processing device is equipped with the function of the Web service, respond to the inquiry with a URL (Uniform Resource Locator) for accessing a management unit of managing information concerning the Web service provided by the image processing device, on the basis of the SLP;
   a second reception unit configured to receive a search request, transmitted from the information processing device to the URL on the basis of a Web service protocol, for searching for the Web service provided by the image processing device; and
   a second response unit configured to respond to the search request with the information indicating the Web service provided by the image processing device, on the basis of the Web service protocol.

2. The image processing device according to claim 1, wherein the function of the Web service includes a function of managing the information concerning the provided Web service, and the provided Web service includes a print service for achieving a print function.

3. The image processing device according to claim 1, wherein the second response unit responds to the search request with identification information uniquely identifying the Web service provided by the image processing device.

4. The image processing device according to claim 1, wherein the Web service protocol includes SOAP (Simple Object Access Protocol).

5. An image processing device which is communicable with an information processing device, comprising:
- a processor and a memory;
- a first reception unit configured to receive an inquiry as to whether or not the image processing device is equipped with a function based on a first protocol, the inquiry being transmitted from the information processing device on the basis of a second protocol different from the first protocol;
- a first response unit configured to, in a case where the image processing device is equipped with the function based on the first protocol, respond to the inquiry, on the basis of the second protocol, with access information for accessing a management unit of managing information concerning a service provided by the image processing device based on the first protocol;
- a second reception unit configured to receive a search request, transmitted from the information processing device to the access information on the basis of the first protocol, for searching for the service provided by the image processing device based on the first protocol; and
- a second response unit configured to respond to the search request, on the basis of the first protocol, with the information indicating the service provided by the image processing device based on the first protocol.

6. The image processing device according to claim 5, wherein the function based on the first protocol includes a function of managing the information concerning the service provided by the image processing device based on the first protocol, and the service provided based on the first protocol includes a print service for achieving a print function.

7. The image processing device according to claim 5, wherein the second response unit responds to the search request with identification information uniquely identifying the service provided by the image processing device based on the first protocol.

8. The image processing device according to claim 5, wherein the first protocol includes SOAP (Simple Object Access Protocol).

9. The image processing device according to claim 5, wherein the search request received by the second reception step and the information responded by the second response unit are described in an XML (eXtensible Markup Language) format.

10. A control method for an image processing device which is communicable with an information processing device, the method comprising:
- receiving an inquiry, transmitted from the information processing device on the basis of an SLP (Service Location Protocol), as to whether or not the image processing device is equipped with a function of a Web service;
- in a case where the image processing device is equipped with the function of the Web service, responding to the inquiry with a URL (Uniform Resource Locater) for accessing a management unit of managing information concerning the Web service provided by the image processing device, on the basis of the SLP;
- receiving a search request, transmitted from the information processing device to the URL on the basis of a Web service protocol, for searching for the Web service provided by the image processing device; and
- responding to the search request with the information indicating the Web service provided by the image processing device, on the basis of the Web service protocol.

11. A control method for an image processing device which is communicable with an information processing device, the method comprising:
- receiving an inquiry as to whether or not the image processing device is equipped with a function based on a first protocol, the inquiry being transmitted from the information processing device on the basis of a second protocol different from the first protocol;
- in a case where the image processing device is equipped with the function based on the first protocol, responding to the inquiry, on the basis of the second protocol, with access information for accessing a management unit of managing information concerning a service provided by the image processing device based on the first protocol;
- receiving a search request, transmitted from the information processing device to the access information on the basis of the first protocol, for searching for the service provided by the image processing device based on the first protocol; and
- responding to the search request, on the basis of the first protocol, with the information indicating the service provided by the image processing device based on the first protocol.

12. A non-transitory computer-readable storage medium which stores a program for performing a control method for an image processing device communicable with an information processing device, the method comprising:
- receiving an inquiry, transmitted from the information processing device on the basis of an SLP (Service Location Protocol), as to whether or not the image processing device is equipped with a function of a Web service;
- in a case where the image processing device is equipped with the function of the Web service, responding to the inquiry with a URL (Uniform Resource Locater) for accessing a management unit of managing information concerning the Web service provided by the image processing device, on the basis of the SLP;
- receiving a search request, transmitted from the information processing device to the URL on the basis of a Web service protocol, for searching for the Web service provided by the image processing device; and
- responding to the search request with the information indicating the Web service provided by the image processing device, on the basis of the Web service protocol.

13. A non-transitory computer-readable storage medium which stores a program for performing a control method for an image processing device communicable with an information processing device, the method comprising:
- receiving an inquiry as to whether or not the image processing device is equipped with a function based on a first protocol, the inquiry being transmitted from the information processing device on the basis of a second protocol different from the first protocol;
- in a case where the image processing device is equipped with the function based on the first protocol, responding to the inquiry, on the basis of the second protocol, with access information for accessing a management unit managing information concerning a service provided by the image processing device based on the first protocol;

receiving a search request, transmitted from the information processing device to the access information on the basis of the first protocol, for searching for the service provided by the image processing device based on the first protocol; and responding to the search request, on the basis of the first protocol, with the information indicating the service provided by the image processing device based on the first protocol.

\* \* \* \* \*